April 26, 1932.    C. TENNYSON ET AL    1,855,461

VALVE SPRING COMPRESSOR

Filed May 13, 1929

Inventors
Christian Tennyson
Arthur H. Yordi

By Louis O. French
Attorney

Patented Apr. 26, 1932

1,855,461

UNITED STATES PATENT OFFICE

CHRISTIAN TENNYSON AND ARTHUR H. YORDI, OF MILWAUKEE, WISCONSIN, ASSIGNORS, BY MESNE ASSIGNMENTS, TO SNAP-ON TOOLS, INC., OF KENOSHA, WISCONSIN, A CORPORATION OF DELAWARE

VALVE SPRING COMPRESSOR

Application filed May 13, 1929. Serial No. 362,750.

The invention relates to valve spring compressors for releasing the tension of the valve springs of valves used in internal combustion engines so that the valves may be renewed or manipulated for grinding.

In aviation motors the valve springs are very powerful, in order to withstand the severe service to which they are put, and the motors themselves are, on the average, of larger bore than the automotive type engine and employ larger valves. Consequently the valve spring compressors ordinarily employed for automotive engines are not suitable for aviation engines and the designs of the engines themselves have to be considered. The object of the present invention is to provide a novel form of valve spring compressor for aviation engines of the valve-in-the-head type, which may be readily applied and will withstand the severe strains imposed upon it and can be easily actuated by the operator without undue effort. More particularly the valve spring compressor according to this invention embodies a spring-release lever-carrying frame that fits onto the tappet lever housing of the engine and is held in position thereon by the pivot pin of said lever, said valve spring lever being depressed by a manually operable cam pivotally mounted on said frame and being capable of adjustment relative to the frame to accommodate different size engines.

The invention further consists in the several features hereinafter set forth and more particularly defined by claims at the conclusion hereof.

In the drawings Fig. 1 is a vertical sectional view through a valve spring compressor embodying the invention, showing it applied to an engine, parts being broken away;

Figure 1:
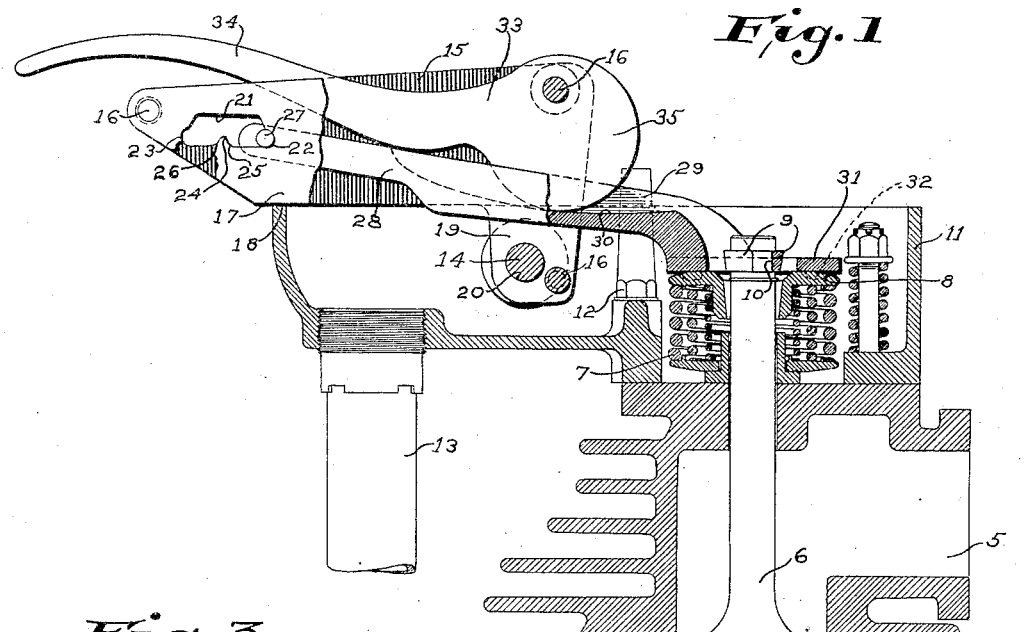
Figure 3:
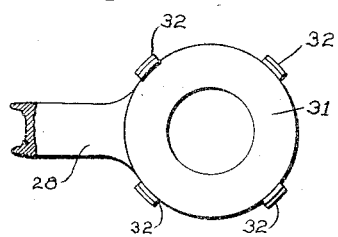
Fig. 3 is a detail plan view of the head of the spring release lever.
Figure 2:
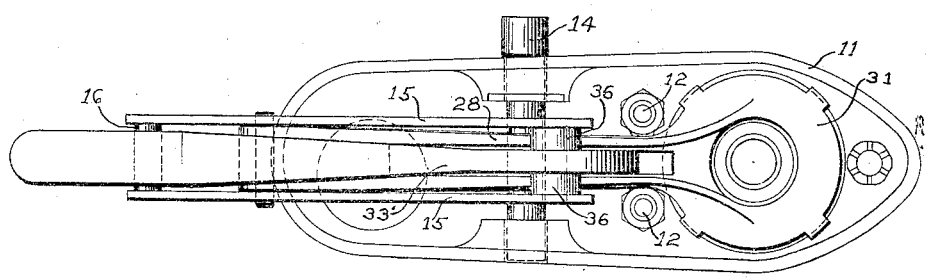
Fig. 2 is a plan view of the device in applied position.

In the drawings the numeral 4 designates the cylinder of an aviation internal combustion engine, 5 one of the ports in said engine, 6 the valve controlling said port, 7 the valve-closing springs interposed between the head and a spring seat disk 8 locked against release by the usual tapered ring formed of half ring sections 9 engaging in an annular groove 10 in the stem of the valve.

A valve tappet lever housing 11 is secured to the head of the cylinder by bolts 12 and has the conduit 13 connected thereto for enclosing the tappet rod (not shown) operated by the valve gear of the engine and has alined bores in its sides receiving the pivot pin 14 of the valve tappet lever.

The compressor embodying the invention includes a frame composed of side frame members 15 and transverse pin 16 riveted to said side members 15, the rear part of the frame at 17 being designed to rest on the edge 18 of the rear wall of the housing and the front portions 19 of said frame depending into the housing and having alined bores 20 through which the pivot pin 14 of the valve tappet lever or its counterpart passes, thus holding the frame in position on the housing.

The side frame members 15 are provided at their rear end portions with alined slots 21 which have notches 22 and 23 and a projection 24 providing stop notches 25 and 26 so that the pivot pin 27 on the valve spring release lever 28 may engage the frame in either of four positions, that is, in either of the notches 22 or 23, or either of the stop notches 25 or 26, whereby the distance that the lever 28 projects from the frame may be adjusted to accommodate the valves of different sized engines.

The lever 28 has a channeled section 29 whose web preferably has a finished upper surface 30 and has an annular disk-shaped head 31 provided with three or more depending fingers 32 that engage and fit over the disk 8 and thus hold the lever against appreciable longitudinal movement relative thereto so that the stops above described will function readily to hold the pivot 27 of said lever in position.

Pivotally mounted on one of the pins 16 of the frame is an operating lever 33 having a handle 34 and a cam portion 35, said lever being centrally mounted on said pin by means of spacing sleeves 36, said cam adapted to engage the surface 30 when the lever 33 is swung downwardly so that the gradually increasing radius of the cam acts upon the intermediate portion of the lever 27 and forces it downwardly, thereby swinging said lever about the pivot and advancing it forward within the limits of the elongated lever connection 22—25 or 23—26 owing to the frictional contact therewith with the result of moving the disk 31 downwardly and rendering it accessible against the pressure of the springs 8 until the half ring sections 9 are free for removal.

It is to be noted that the cam lever 34 is self locking in its extreme counterclockwise position effecting the compression of the valve spring 7 to enable the dismantling of the valve assembly. This is important in that the attendant or operator is free to perform his work unhampered, and the spring 7 is retained in position to receive another valve 6 or to conveniently afford the assembly thereof subsequent to grinding. Upon removal of the ring sections 9 the valve may be taken out to be manipulated for grinding and upon the return of the lever 33, and hence the lever 28, the disk 8 and the springs 7 may be removed from the valve to permit work to be done on the valve.

It will be noted that the position of the pin 14 on the frame of the compressor is adjacent that portion of the lever 28 upon which the cam 35 acts when exerting its greatest pressure so that the strains are efficiently transmitted from the levers 33 and 28 to the compressor frame and pin 14 and thence to the housing.

We desire it to be understood that this invention is not to be limited to any particular form or arrangement of parts except insofar as such limitations are specified in the claims.

What we claim as our invention is:

1. In a valve spring compressor for engines having pivoted tappet levers, the combination of a frame secured to the engine through connection with the pivotal bearing of the tappet lever, a spring release lever pivotally mounted on said frame and engageable with the spring seat portion of the valve, and a manually-operable lever having a cam engageable with said spring release lever to move the same to relieve the spring tension on the valve.

2. In a valve spring compressor for engines having tappet lever housings and pivoted tappet levers mounted in said housings the combination of a frame bearing against a wall of said housing and secured to the housing and adapted to be supported upon a pivot pin for said tappet lever, a spring release lever pivotally mounted on said frame and engageable with the spring seat portion of the valve, and a manually-operable lever having a cam engageable with said spring release lever to move the same to relieve the spring tension on the valve.

3. In a valve spring compressor for engines having pivoted tappet levers, the combination of a frame secured to the engine through connection with the pivotal bearings of the tappet lever, said frame being provided with a plurality of pivot pin settings, a spring release lever having a pivot pin disposable in any one of said settings and having a spring-seat-engaging head, and an actuating lever mounted on said frame for depressing said spring release lever.

4. In a valve spring compressor for engines having tappet lever housings and pivoted tappet levers mounted in said housings, the combination of a frame comprising spaced side members and transverse members connecting said side members, said side members bearing against the rear wall of the housing and having depending portions in which the pivot pin of said tappet lever is mountable to support the forward portion of said frame, a spring release lever pivotally connected to said frame and working between said frame members, and a lever pivotally mounted on said frame between said side members and having a cam engageable with said spring release lever to move the same to release the spring tension on said valve.

5. In a valve spring compressor for engines having tappet lever housings and pivoted tappet levers mounted in said housings, the combination of a frame comprising spaced side members and transverse members connecting said side members, said side members bearing against the rear wall of the housing and having depending portions in which the pivot pin of said tappet lever is mounted to support the forward portion of said frame, said side frame members having alined slots providing a plurality of pivot pin settings, a spring release lever having a pivot pin disposable in any one of said settings and having a spring-seat-engaging head, and an actuating lever having camming engagement with said spring release lever to move the same to relieve the spring tension on the valve.

6. In a valve spring compressor, the combination with a frame, of a valve spring release lever operatively connected to said frame for predetermined movement, a lever cam pivoted to said frame to impart predetermined movement to said release lever, and means on said release lever complemental to said lever cam to maintain an operative alignment therebetween.

7. In a valve spring compressor, the combination with a frame, of a valve spring release lever operatively connected to said frame for predetermined movement, a lever cam pivoted to said frame to impart predetermined movement to said release lever, there being a groove in said spring release lever to receive said lever cam for maintaining an operative alignment therebetween.

8. In a valve spring compressor, the combination with a frame, of a valve spring release lever operatively connected to said frame for predetermined movement, means for actuating said valve spring release lever, and means for varying the operative connection of said valve spring lever relative to said frame for adjusting the spring engaging position of said release lever.

9. In a device of the character described, the combination with a frame, of a valve spring compressing lever mounted on said frame, a pivotal and linearally movable connection between said spring compressing lever and frame, and an actuating lever operative to effect the pivotal and linear displacement of said spring compressing lever.

10. In a device of the character described, the combination with a frame, of a valve spring compressing lever mounted on said frame, a pivotal and linearally movable connection between said spring compressing lever and frame, an actuating lever operative to effect the pivotal and linear displacement of said spring compressing lever, and means for attaching said frame to a valve casing.

In testimony whereof, we affix our signatures.

CHRISTIAN TENNYSON.
ARTHUR H. YORDI.